United States Patent
Simonyi

(10) Patent No.: US 7,607,099 B2
(45) Date of Patent: Oct. 20, 2009

(54) METHOD AND SYSTEM FOR REVERSIBLE DESIGN TREE TRANSFORMATIONS

(75) Inventor: Charles Simonyi, Medina, WA (US)

(73) Assignee: Intentional Software Corporation, Bellevue, WA (US)

( * ) Notice: Subject to any disclaimer, the term of this patent is extended or adjusted under 35 U.S.C. 154(b) by 180 days.

(21) Appl. No.: 10/701,369

(22) Filed: Nov. 3, 2003

(65) Prior Publication Data

US 2005/0097453 A1 May 5, 2005

(51) Int. Cl.
*G06F 17/00* (2006.01)
(52) U.S. Cl. ............... 715/763; 715/854; 715/234; 715/236; 717/105; 709/246
(58) Field of Classification Search ........... 715/513, 715/853, 234, 239, 242, 250; 717/113, 10
See application file for complete search history.

(56) References Cited

U.S. PATENT DOCUMENTS

| | | | |
|---|---|---|---|
| 5,339,433 A | 8/1994 | Frid-Nielsen | |
| 5,415,275 A | 5/1995 | Girimont | |
| 5,493,678 A | 2/1996 | Arcuri et al. | |
| 5,546,519 A | 8/1996 | Berry | |
| 5,557,730 A | 9/1996 | Frid-Nielsen | |
| 5,642,511 A | 6/1997 | Chow et al. | |
| 5,748,975 A | 5/1998 | Van De Vanter | |
| 5,752,058 A | 5/1998 | Van De Vanter | |
| 5,790,863 A * | 8/1998 | Simonyi ............... 717/113 | |
| 5,802,334 A | 9/1998 | Nickolas et al. | |
| 5,813,019 A | 9/1998 | Van De Vanter | |
| 5,850,548 A | 12/1998 | Williams | |
| 5,857,212 A | 1/1999 | Van De Vanter | |
| 5,911,070 A | 6/1999 | Solton et al. | |
| 5,915,259 A | 6/1999 | Murata et al. | |
| 6,018,627 A | 1/2000 | Iyengar et al. | |
| 6,026,233 A | 2/2000 | Shulman et al. | |
| 6,038,393 A | 3/2000 | Iyengar et al. | |
| 6,091,893 A | 7/2000 | Fintel et al. | |
| 6,115,723 A | 9/2000 | Fallside | |
| 6,182,274 B1 | 1/2001 | Lau | |
| 6,212,672 B1 | 4/2001 | Keller et al. | |
| 6,272,672 B1 | 8/2001 | Conway | |
| 6,314,559 B1 | 11/2001 | Sollich | |
| 6,385,769 B1 | 5/2002 | Lewallen | |
| 6,415,275 B1 | 7/2002 | Zahn | |
| 6,415,299 B1 | 7/2002 | Baisley | |
| 6,421,821 B1 | 7/2002 | Lavallee | |
| 6,453,324 B1 | 9/2002 | Baisley | |
| 6,466,240 B1 * | 10/2002 | Maslov ............... 715/853 | |

(Continued)

FOREIGN PATENT DOCUMENTS

WO    WO 02/03252    1/2002

OTHER PUBLICATIONS

Carlos et al. "Domain Analysis of Object-Oriented Frameworks in Framedoc" 2002 by Seke Ischia, Italy pp. 27-33.*

(Continued)

*Primary Examiner*—Doug Hutton
*Assistant Examiner*—Quoc A Tran
(74) *Attorney, Agent, or Firm*—Perkins Coie LLP

(57) ABSTRACT

A method and system for transforming versions of a design tree and transforming identity-descriptions relating to the versions of a design tree. The transformation system provides a pipeline of transforms for sequentially transforming versions of a design tree and transforming identity-descriptions relating to the versions of the design tree. Each transform may provide a command interface for manipulating the input version of the design tree or for setting parameters to control the transformations of a transform.

24 Claims, 12 Drawing Sheets

U.S. PATENT DOCUMENTS

| | | | |
|---|---|---|---|
| 6,792,595 B1 * | 9/2004 | Storistenau et al. | 717/110 |
| 6,996,781 B1 * | 2/2006 | Myers et al. | 715/763 |
| 2002/0007483 A1 | 1/2002 | Lopez | |
| 2002/0010713 A1 | 1/2002 | Egilsson | |
| 2002/0073119 A1 | 6/2002 | Richard | |
| 2004/0083453 A1 * | 4/2004 | Knight et al. | 717/113 |
| 2005/0273759 A1 * | 12/2005 | Lucassen et al. | 717/105 |

OTHER PUBLICATIONS

Boshernitsan, Marat, Michael Downes. "Visual Programming Languages: A Survey." Berkeley, CA: University of California, Berkeley Computer Sciences Division; 2004. Technical Report No. UCB/CSD-04-1368, 28pp.

Decouchant, Domnique, and Manual Romero Salcedo. "Alliance: A Structured Cooperative Editor on the Web". In: Proceedings of the ERCIM workshop on CSCW and the Web. Sankt Augustin, Germany, Feb. 1996, 6 pp.

Eclipse. Home page. http://eclipse.org/main.html, accessed Nov. 21, 2005, 3pp.

Engström, Henrik. "Jackson Structured Programming Editor." http://web.archive.org/web/20030625214820/www.ida.his.se/~henrike/JSP/example.chtml, accessed Nov. 21, 2005, 2pp.

Habermann, A. Nico, and David Notkin. "Gandalf" http://www.cs.washington.edu/homes/notkin/talks/icse97-case/sld027.htm, accessed Nov. 21, 2005, 1p.

Hoeven, Joris Van der. "GNU TeXmacs: A Free, Structured, wysiwyg and Technical Text Editor." Paris: Cahiers GUTenberg, May 2001, pp. 39-50.

IBM. "IBM VisualAge for Java, Professional and Enterprise Editions Version 4.0, Assists Developers in the Creation of Java-based e-business Applications." Software Announcement, Jun. 26, 2001. http://www-306.ibm.com/fcgi~bin/common/ssi/ssialias?infotype=an&subtype=ca&appname=Demonstration&htmlfid=897/ENUS201-182, 15 pp.

Ingalls, Dan and Scott Wallace, Yu-Ying Chow, Frank Ludolph, Ken Doyle. "Fabrik: A Visual Programming Environment." OOPSALA '88 Conference Proceedings. http://users.ipa.net/~dwighth/smalltalk/Fabrik/Fabrik.html, 18 pp.

Khoral. "Cantata Visual Programming Environment Description." http://web.archive.org/web/20040411231419/http://khoral.com/khoros/cantata/desc.php, accessed Dec. 21, 2005, 2pp.

Massachusetts Institute of Technology. "LAPIS Editing Text with Lightweight Structure." http://groups.csail.mit.edu/graphics/lapis, accessed Nov. 21, 2005, 3pp.

Najork, Marc. "Cube: A 3D Visual Programming Language." http://web.archive:org/web/20021211163908/http://research.compaq.com/SRC/personal/najork/cube.html, accessed Nov. 21, 2005, 3pp.

Plotkin, David. "Alice—The Personal Pascal." *Antic*, vol. 6, No. 2, Jun. 3, 1987, http://www.atarimagazines.com/v6n2/Alice.html, 6pp.

Rational. "Rational XDE Professional: Liberated Development." http://web/archive.org/web/20020602015920/www.rational.com/products/xde/, accessed Nov. 21, 2005, 4 pp.

Squeak, Home Page. www.squeak.org, accessed Nov. 21, 2005, 3pp.

* cited by examiner

METHOD AND SYSTEM FOR REVERSIBLE DESIGN TREE TRANSFORMATIONS

TECHNICAL FIELD

The described technology relates generally to the transformations of design trees.

BACKGROUND

Computer programs are generally written in a high-level programming language (e.g., Java or C++). Compilers are then used to translate the instructions of the high-level programming language into machine instructions that can be executed by a computer. The compilation process is generally divided into six phases:

1. Lexical analysis
2. Syntactic analysis
3. Semantic analysis
4. Intermediate code generation
5. Code optimization
6. Final code generation During lexical analysis, the source code of the computer program is scanned and components or tokens of the high-level language are identified. The compiler then converts the source code into a series of tokens that can be processed during syntactic analysis. For example, during lexical analysis, the compiler would identify the statement cTable=1.0;

as the variable (cTable), the operator(=), the constant (1.0), and a semicolon. A variable, operator, constant, and semicolon are tokens of the high-level language.

During syntactic analysis (also referred to as "parsing"), the compiler processes the tokens and generates a syntax tree to represent the program based on the syntax (also referred to as "grammar") of the programming language. A syntax tree is a tree structure in which operators are represented by non-leaf nodes and their operands are represented by child nodes. In the above example, the operator (=) has two operands: the variable (cTable) and the constant (1.0). The terms "parse tree" and "syntax tree" are used interchangeably in this description to refer to the syntax-based tree generated as a result of syntactic analysis. For example, such a tree optionally may describe the derivation of the syntactic structure of the computer program (e.g., it may describe that a certain token is an identifier, which is an expression as defined by the syntax). Syntax-based trees may also be referred to as "concrete syntax trees" when the derivation of the syntactic structure is included, and as "abstract syntax trees" when the derivation is not included.

During semantic analysis, the compiler modifies the syntax tree to ensure semantic correctness. For example, if the variable (cTable) is an integer and the constant (1.0) is a floating-point, then during semantic analysis a floating point to integer conversion would be added to the syntax tree.

During intermediate code generation, code optimization, and final code generation, the compiler generates machine instructions to implement the program represented by the syntax tree. A computer can then execute the machine instructions.

A system has been described for generating and maintaining a computer program represented as an intentional program tree, which is a type of syntax tree. (For example, U.S. Pat. No. 5,790,863 entitled "Method and System for Generating and Displaying a Computer Program" and U.S. Pat. No. 6,097,888 entitled "Method and System for Reducing an Intentional Program Tree Represented by High-Level Computational Constructs," both of which are hereby incorporated by reference.) The system provides a mechanism for directly manipulating nodes corresponding to "program elements" by adding, deleting, and moving the nodes within an intentional program tree. An intentional program tree is one type of "program tree." A "program tree" is a tree representation of a computer program that includes operator nodes and operand nodes representing program elements. A program tree may also include inter-node references (i.e., graph structures linking nodes in the tree), such as a reference from a declaration node of an identifier to the node that defines that identifier's type. For example, a node representing the declaration of an identifier to be an integer includes a reference (i.e., non-tree pointer) to a node that defines the integer type. An abstract syntax tree and a concrete syntax tree are examples of a program tree. Once a program tree is generated, the system performs the steps of semantic analysis, intermediate code generation, code optimization, and final code generation to transform the computer program represented by the program tree into executable code.

Program trees can be used to represent designs not only in traditional computer programming languages (e.g., Java and C++) but also in domain-specific languages (e.g., the Extensible Markup Language ("XML") and the Universal Modeling Language ("UML")). The domain-specific languages can be used to specify designs as varied as controlling an internal combustion engine or graphics for a slide presentation. Thus, program trees may more generally be referred to as "design trees" because they represent designs other than those of computer programs. For example, a slide presentation may be represented by a design tree that has a subtree for each slide of the presentation that specifies the content (or design) of that slide. A subtree for a slide may specify, for example, that the slide contains two boxes of equal size. With such a specification, when one of the boxes is resized, the other box may be automatically resized in accordance with the "equal size" relationship of the design. In the case of an internal combustion engine, the design tree may specify the function of each engine component and the interaction between the component based on a user-specified operating environment.

It is typically easiest for a designer to manipulate or edit a program using a view that is specific to the domain or that the designer is familiar with. For example, a programmer experienced in Java may prefer to edit a program tree using a Java view, whereas a programmer experienced in C++ may prefer a C++ view. A designer may even prefer to use different views at different times depending on the type of manipulation that is needed. For example, the controls of an internal combustion engine can be shown in a function block view or a mathematical formula view. As another example, a slide presentation can be shown in a "slide sorter" view, a presentation view, or an intermediate view (i.e., a large slide shown next to smaller slides).

Various techniques have been used to control the editing of computer program. These techniques include text-based editors and structured editors. A programmer uses a text-based editor to enter the letters, numbers, and other characters that make up the source code for the computer program. The text-based editor may store these characters in an unstructured format in a source code file using an ASCII format and delimiting each line by an end-of-line character. The format is unstructured because computer program in that format needs to be parsed to identify the syntactic elements.

Structured editors, also known as syntax-driven editors, assist programmers in the correct specification and manipulation of source code for a computer program. In addition to performing the functions of a text-based editor, a structured editor may perform lexical and syntactic analysis as the programmer is entering the source code. A structured editor typically maintains a structured representation of the source code based on the hierarchy of the programming language syntax. This structured representation may be a syntax tree. As a programmer enters the characters of the source code, the structured editor may perform lexical and syntactic analysis. If the structured editor detects a lexical or syntactic error, it typically notifies the programmer and requires correction before the programmer can continue entering the source code. Structured editors may store the computer program in unstructured format or structured format. If stored in unstructured format, then the structured editor needs to convert the computer program to a structured format before editing and to the unstructured format after editing.

Various architectures may be used to control the editing of computer programs. These architectures include a single editing view architecture and a synchronized model view architecture. A single editing view architecture typically allows a computer program to be edited only through a single view, and allows the computer program to be displayed read-only in many different views. For example, an editing system might allow a user to edit a computer program only using a C++ view. That editing system might, however, provide a UML view or some hierarchical view of the computer program that is read-only. A disadvantage of such an architecture is that a programmer is forced to use a single view to edit the computer program, even when the editing might more logically and easily be performed in a different view.

The synchronized view and model architecture converts the computer program (i.e., model) to a form that is appropriate for the view. For example, a Java program can be viewed and edited using a Universal Markup Language ("UML") view. To generate the UML view, a new representation of the computer program (i.e., a structured representation) is generated that is more conducive to UML manipulation. Any changes made to the UML representation need to eventually be reflected in the Java text representation (e.g., an unstructured format). A disadvantage of such an architecture is that the generation of different representations can be very expensive and may need to be performed for each different view. Another disadvantage is that the conversions between representations, because they are so complex, often result in inconsistencies or loss of data. Another disadvantage is that it is difficult to implement and extend systems that use this architecture because commonalities between view implementations are not exploited.

With either architecture, a model-view-controller ("MVC") design may be used to provide separation between the computer program (i.e., the model), the user interface for displaying the computer program (i.e., the view), and the editing of the computer program (i.e., the controller). Different user interfaces can be developed to allow for different views of the computer program. For example, a C++ view and a UML view can be developed to display a computer program. Because the editing techniques for these views are so different, it would typically be necessary to also develop a different controller and a different model for each view. For example, a C++ view may use a model that stores the computer program in an unstructured format, and a UML view may use a model that stores the computer program in a structured format. A disadvantage of such a technique is that it can be very time consuming, complex, and expensive to develop a different MVC design for each view. For example, conversion routines may be needed to convert the model used for persistent storage to the model of each view. In addition, an architecture using MVC design has no built-in support for multiple editable views. As such, systems that use such an architecture tend to be not very modular or extensible and the user experience tends to be less than satisfactory.

DETAILED DESCRIPTION

Figure 1:
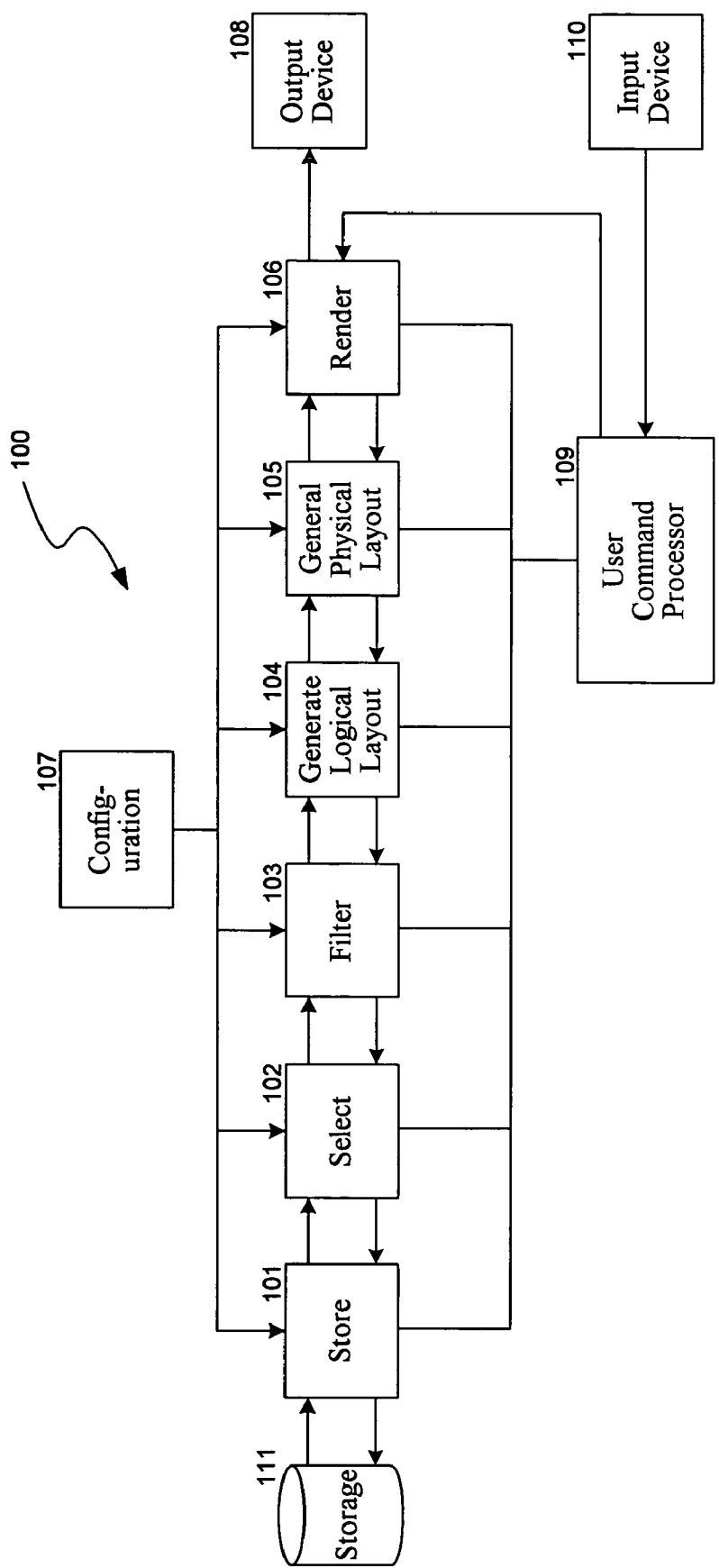
FIG. 1 is a block diagram illustrating a pipeline of transforms in one embodiment.

A method and system for transforming versions of a design tree and transforming identity-descriptions relating to the versions of a design tree (or other structured representations) is provided. In one embodiment, the transformation system provides a pipeline of transforms for sequentially transforming versions of a design tree (i.e., forward transformations such as a transformation for displaying the design tree) and transforming identity-descriptions relating to the versions of the design tree (i.e., backward transformations such as a description for a portion of the design tree). Each transform may provide a command interface for setting state parameters to control the transformations of the transform. For example, a transform may receive via the command interface a state-setting command for tree-editing to indicate that the transformation is to delete a portion of the design tree or a parameter-setting command specifying that the details of an outline form are to be expanded by the transformation. A user command processor may input editing commands from a user and invoke a function of the command interface of the appropriate transform to effect the performing of the command relative to an identity-description. The user command processor can retrieve state information of a transform. For example, the user command processor can retrieve the transformed identity-description of a transform for use as an operand of a tree-editing command. The use of a pipeline architecture of transforms that transform versions of the design tree and transform identity-descriptions relating to the versions of the design tree facilitates the development of a design tree editing environment by permitting logical subdivision of programming tasks and reuse of editing, display, and transformation components.

The pipeline may include a source transform, immediate transforms, and a sink transform. The source transform manipulates a source version of the design tree in accordance with commands stored in its state and outputs a version of the manipulated design tree for input by the next transform. The source version of the design tree is the version that is edited and persistently stored. The pipeline may also include a series of intermediate transforms that each input a version of the design tree that is output from the previous transform in the pipeline and output a transformed version of the design tree that is input to the next transform in the pipeline. The non-source versions of the design tree are versions of the design tree that have been transformed by one or more transformations and that are not in general persistently stored. Each intermediate transforms also inputs from the next transform identity-descriptions relating to its output version of the design tree and outputs to the previous transform identity-descriptions relating to its input version of the design tree. An identity-description can be any type of designator that identifies a subset of a version of the design tree. For example, a design tree may represent a class definition and the input version for a transform may represent a logical layout view and the output version may represent a physical layout view, and the identity-descriptions received by the transform reference the physical layout view while the transformed identity-descriptions reference the logical layout view. The pipeline may include a sink transform that inputs a version of the design tree and outputs in the backward direction identity-descriptions relating to the input design tree. For example, the sink transform may display the design tree (e.g., on a computer monitor) to a user and generate identity-descriptions based on user pointing interactions relating to the input version of the design tree.

As described above, forward transforms transform versions of the design tree, and backward transforms transform identity-descriptions. Forward transforms input versions of the design tree that are closer to the source version and output versions of the design tree that are closer to the display device or other receivers of the transformed versions of the design tree. For example, a forward transform may transform a version without outlining into a version with outlining. As another example, a forward transform may transform a version that is an abstract tree representation of a program into a tree representation of the program based on conventional C language syntax with nodes representing strings such that when the tree is displayed it looks like a program in the C language. Backward transforms output identity-descriptions that are closer to the source version of the design tree than the input identity descriptions. A backward transform changes an input identity-description that designates a portion of the output version of the design tree to designate a corresponding portion of the input version of the design tree.

FIG. 1 is a block diagram illustrating a pipeline of transforms in one embodiment. The pipeline 100 includes transforms 101-106. The store transform 101 is a source transform; the select transform 102, the filter transform 103, the generate logical layout transform 104, and the generate physical layout transform 105 are intermediate transforms; and the render transform 106 is a sink transform. The pipeline interfaces with an output device 108, a user command processor 109, and a storage 111. The user command processor provides identity-descriptions to the render transform that is propagated backwards through the transforms. The user command processor also inputs commands from the user (e.g., delete) and performs the command by invoking functions the command interface of the appropriate transforms. The transformed versions of the design tree are forward propagated through the transforms.

Each of the transforms performs its transformation in sequence based on changes to the design tree. The store transform coordinates the access to a version of the design tree stored persistently on storage. The store transform outputs a version of the design tree that is stored in memory and inputs commands relating to changes that are to be made to the design tree.

The select transform outputs a version of the design tree indicating selected portions, such as certain subtrees. For example, when a design tree represents a computer program with many modules, only certain of those modules might be selected by the user for future editing at any given time. The select transform receives selection commands indicating the portions of the design tree to be selected using an identity-description. For example, when a user specifies a command to select a certain portion of the design tree, the user command processor invokes a function of the select transform to effect the selection by setting its parameters. The effect of the selection may be to output a version of the design tree with the selected portions highlighted. The highlighting may be indicated in one embodiment by appropriate properties in the output version of the design tree.

The filter transform may filter the design tree to remove certain types of data in accordance with the parameters set by the user command processor. For example, if the design tree represents a class definition, then the filter transform may remove the body of the methods of that class, leaving only the prototype for the methods in accordance with a parameter that specifies to not display the body.

The generate logical layout transform generates a version of the design tree representing the logical layout of the design tree. A version of a design tree that represents a logical layout view may have nodes that represent displayable elements (e.g., rows and paragraphs) and properties for their logical arrangement (e.g., indentation, centering, and alignment). For example, the generate logical layout transform may alphabetically order the methods and the fields of class definitions based on a parameter setting or may specify that a rectangle is to represent the class and sub-rectangles are to represent the fields and methods of the class.

The generate physical layout transform may generate a version of the design tree that graphically represents its physical layout. A version of a design tree that represents a physical layout view may have nodes that represent displayable elements with specific locations within a specific coordinate systems (e.g., x, y, and z coordinates relative to a specific origin). Various parameters may be provided to control the layouts. For example, a parameter may be provided to specify a graphical layout or an outline layout for a class definition.

The render transform inputs the physical layout design tree and renders that layout to the output device. The render transform also inputs an identity-description (e.g., x and y coordinates) of a portion of the design tree generated by the user command processor.

The user command processor performs the commands and sets parameters by invoking functions of the command interface of the transforms. The user command processor may provide initial parameter settings or configuration information 107 to each transform in the pipeline. For example, the configuration information for the filter transform may indicate what information of the design tree is to be always filtered out (e.g., comments). One skilled in the art will appreciate that other transforms and different orderings of the transforms can be used. For example, in one embodiment, the pipeline contains a store, domain notation, selection, outlining, filtering, sorting, abstract layout, concrete layout, pending, physical layout, scrolling, and rendering in this order. (The pending function is described in U.S. patent application Ser. No. 10/435,497, entitled "Method and System for Storing Pending Changes to Data" and filed on May 9, 2003, which is hereby incorporated by reference.)

In one embodiment, the transformation system can be used to support "persistent versioning" of source documents (i.e., the source version of a design tree). The commands provided to the store transform by the user command processor represent all the commands needed to create and modify a source document. For example, an add command specifies an element to add to a document at an insertion point (e.g., identity-description), while a delete command specifies an element to delete that is identified by an identity-description. The complete set of these commands defines the document. The transformation system may store these commands along with a time stamp, version, and so on for each command. The transformation system can generate the state of the document for a certain time (or source-document version) by executing the commands up to that time or by undoing the effects of the commands executed after that time. The sequence of commands can also be used when merging edits made to a document by different users.

Figure 2:
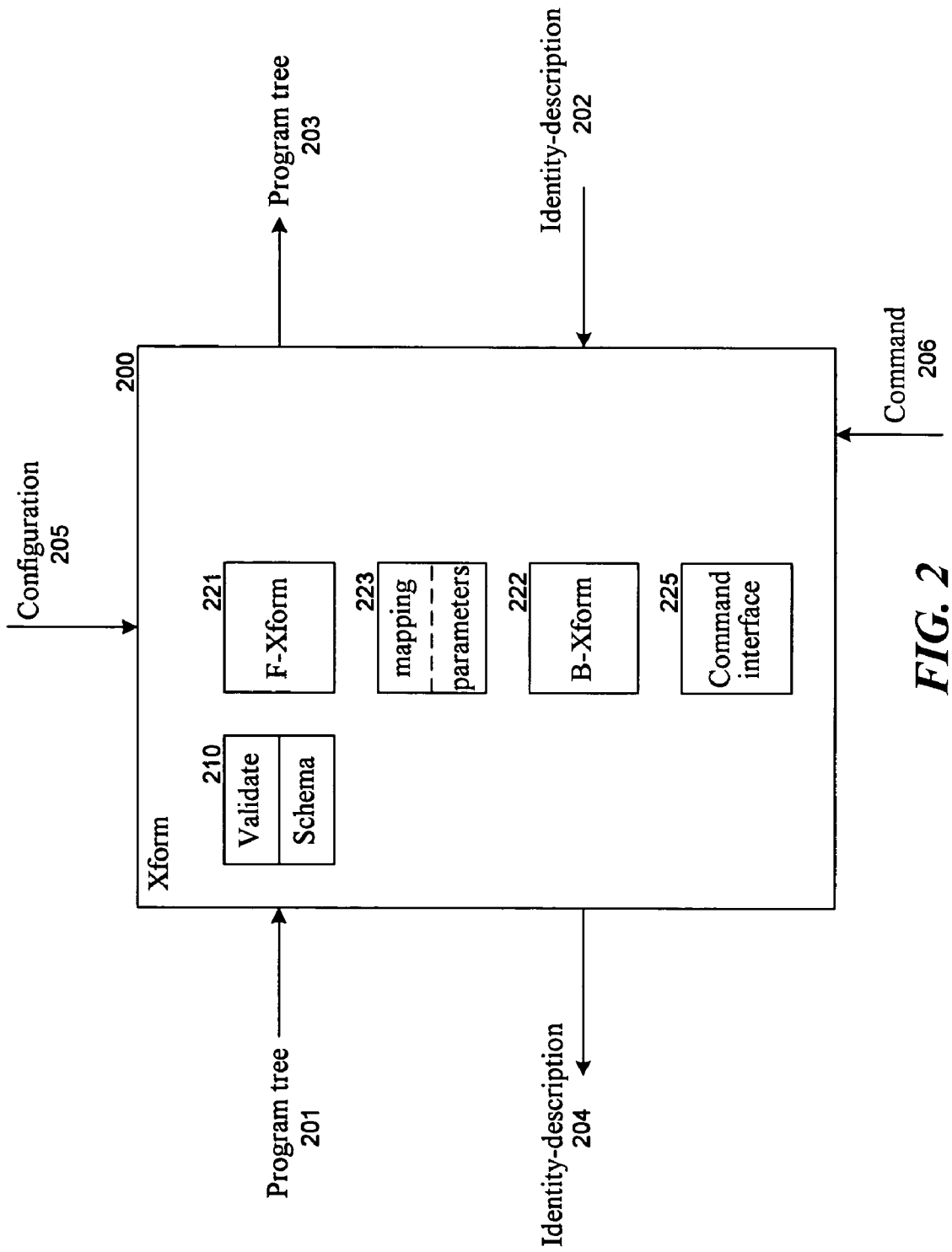
FIG. 2 is a block diagram illustrating components of a transform in one embodiment.

FIG. 2 is a block diagram illustrating components of a transform in one embodiment. The following examples are described in terms of a program tree as just one example of a design tree. Transform 200 inputs program tree 201, identity-description 202, configuration data 205, and commands 206, and outputs program tree 203 and identity-description 204. The transform includes a validate component 210 that validates whether the input version of the program tree corresponds to the program tree schema. The transform includes a forward (or program tree) transform component 221 and a backward (or identity-description) transform component 222. The forward transform component transforms the input version of the program tree to the output version of the program tree and generates and stores in its state a mapping from the elements of the output program tree to the elements of the input program tree. The backward transform component transforms the identity-description 202 from identifying an element of the output design tree to identifying an element of the input design tree in accordance with the mapping. The forward transform and the backward transform component store state information (e.g., the mappings and parameters) in the state store 223. The state store may include an in-memory representation of the input version of the program tree and the output version of the program tree. The command interface 225 provides an interface that inputs user commands from the command processor and manipulates the input program tree in accordance with the commands and sets parameters to control the transformation process.

Each transform maintains mappings so that an identity-description relative to the output program tree can be transformed to an identity-description relative to the input program tree. For example, the program tree may represent a function with two arguments (e.g., f(1, 2)). The input program tree may contain a parent node for the function with a child node for each argument. The output program tree may also contain a parent node and a child node for each argument, but may also have child nodes for the open parenthesis, the comma, and the close parenthesis. The mapping would map the parent nodes and the child nodes corresponding to the arguments. The mapping may also map the nodes representing the parentheses and comma of the output program tree to nodes of the input program tree. For example, the parentheses and comma may each be mapped to the parent node of the input program tree. However, with such a many-to-one mapping, information may be lost from one transform to the previous transform. To prevent such a loss, the transform may add virtual identifiers to the identity-descriptions that provide more detailed mapping. For example, the mapping may provide a two-part virtual identity-descriptions. The first part may identify a node of the input tree, and the second part may be a virtual identifier that identifies the particular node among the nodes of the output program tree that was mapped (e.g., "f" or "("). In this way, the user command processor can perform a command not only based on an identified node, but also based on how the node was specified.

Some transforms may be applied in the pipeline an indefinite number of times, such as until all the output becomes appropriate for the next transform in the pipeline. For example, a part of the design tree may require two applications of the same transformation for its processing. The first application of the transformation may transform the input design tree into a grid of components, and the second application may transform the grid into a list of components. Each application of the transformation would maintain its own mapping, but there would be only one command interface. A new instance of the mapping would be instantiated when a part of the design tree that would create an output (like the grid in the example) that is appropriate for the current transformation, but not appropriate for the next transformation, is encountered. The appropriateness of nodes for a transformation, in one embodiment, is determined by the use of definitions that are called "schemas," and which are also stored as design trees.

The transformation system allows for commands to be specified via the command processor as described above or via selection of the program tree itself. When a program tree is rendered, it may include handles for controlling the display or editing of elements. For example, an outline may be displayed with a "+" or a "−" handle at each level to indicate whether the level is to be expanded or contracted. When a "+" is selected, the identity-description of the "+" is propagated backwards through the transforms until a transform, such as the filter transform, can process the command associated with the "+" selection. The filter transform may output a new program tree with the selected level expand and with a "−" handle associated with that level. If that "−" handle is then selected, its identity-description would again be propagated backwards and the filter transform would then output the contracted level with the "+" handle. The command processor, in contrast, receives commands that may be specified via a menu or some other way not directly tied to the selection of a portion of the program tree. Some commands such as the expand/contract command, whether specified via the command processor or selection of a portion of the program tree, are ephemeral and do not result in a persistent change of the program tree. Such changes may be represented as parameters of a transform. For example, each level of an outline may have an expand/contract parameter that a filter transform uses when generating its output version. Such a parameter, however, is not propagated backwards to a store transform.

Figure 3:
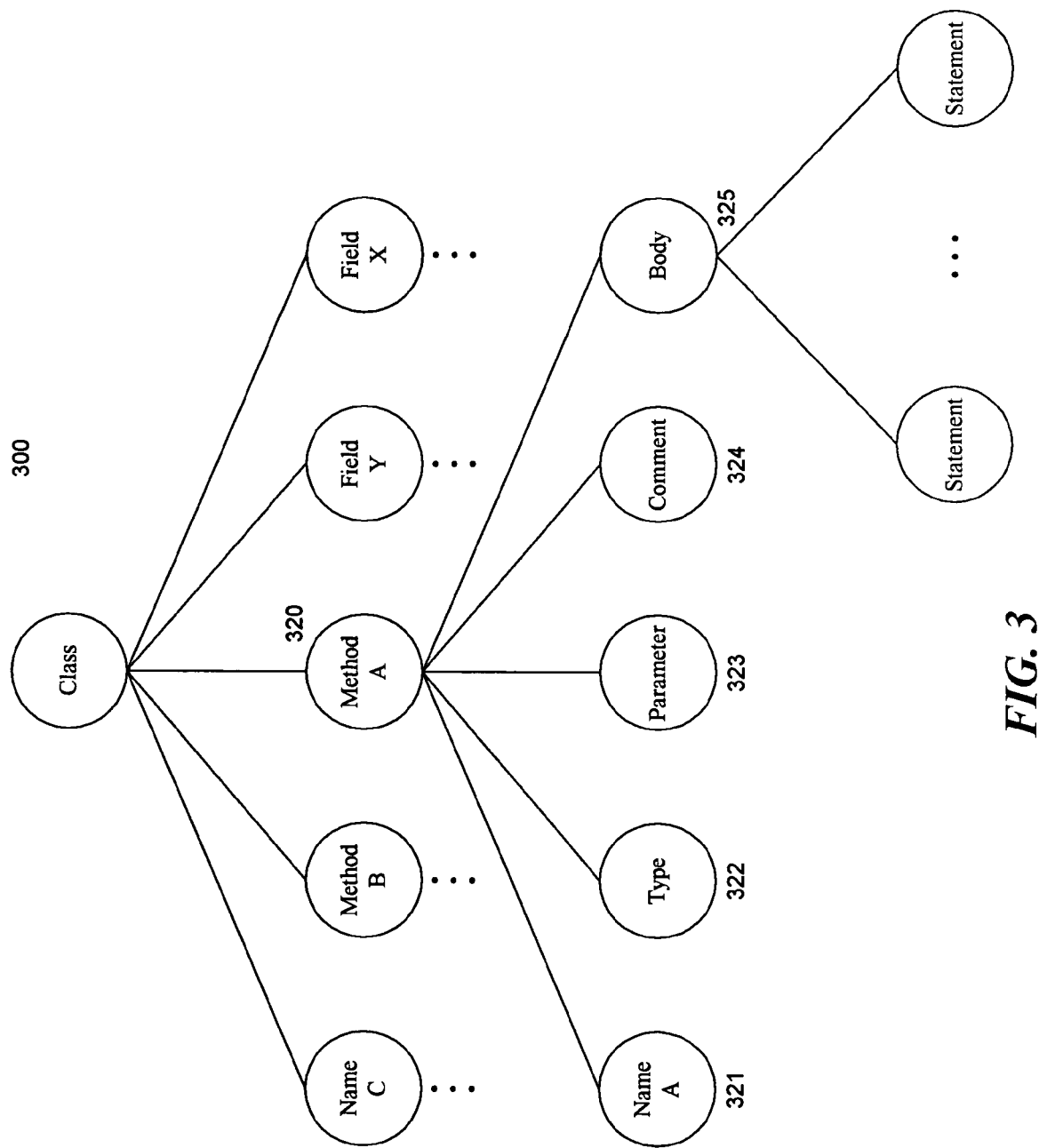
FIG. 3 is a diagram illustrating a version of the program tree that is output by the select transform in one embodiment.
Figure 4:
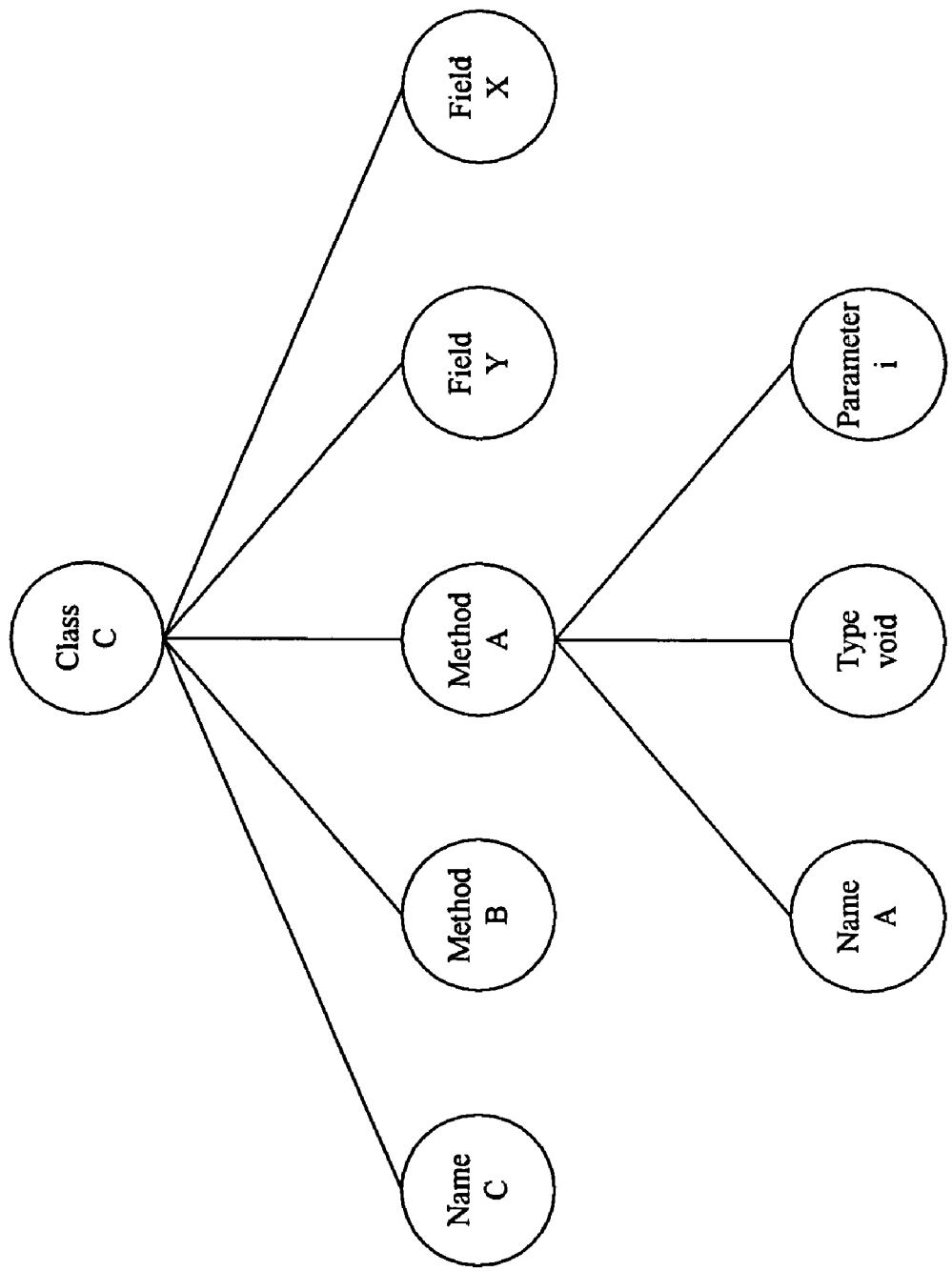
FIG. 4 is a diagram illustrating a version of the program tree that is output by the filter transform in one embodiment.
Figure 5:
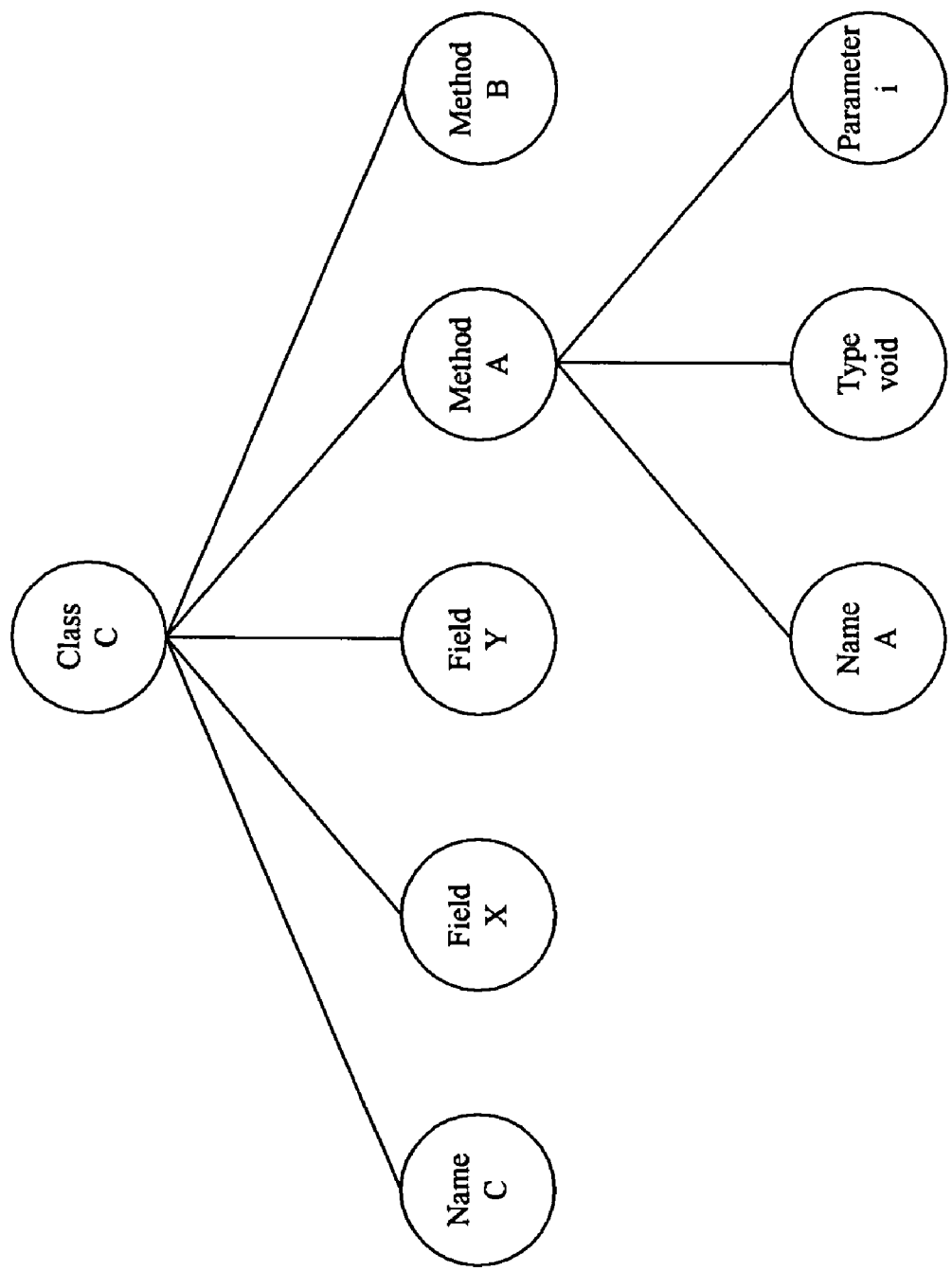
FIG. 5 is a diagram illustrating a version of the program tree that is output by the generate logical layout transform in one embodiment.
Figure 6:
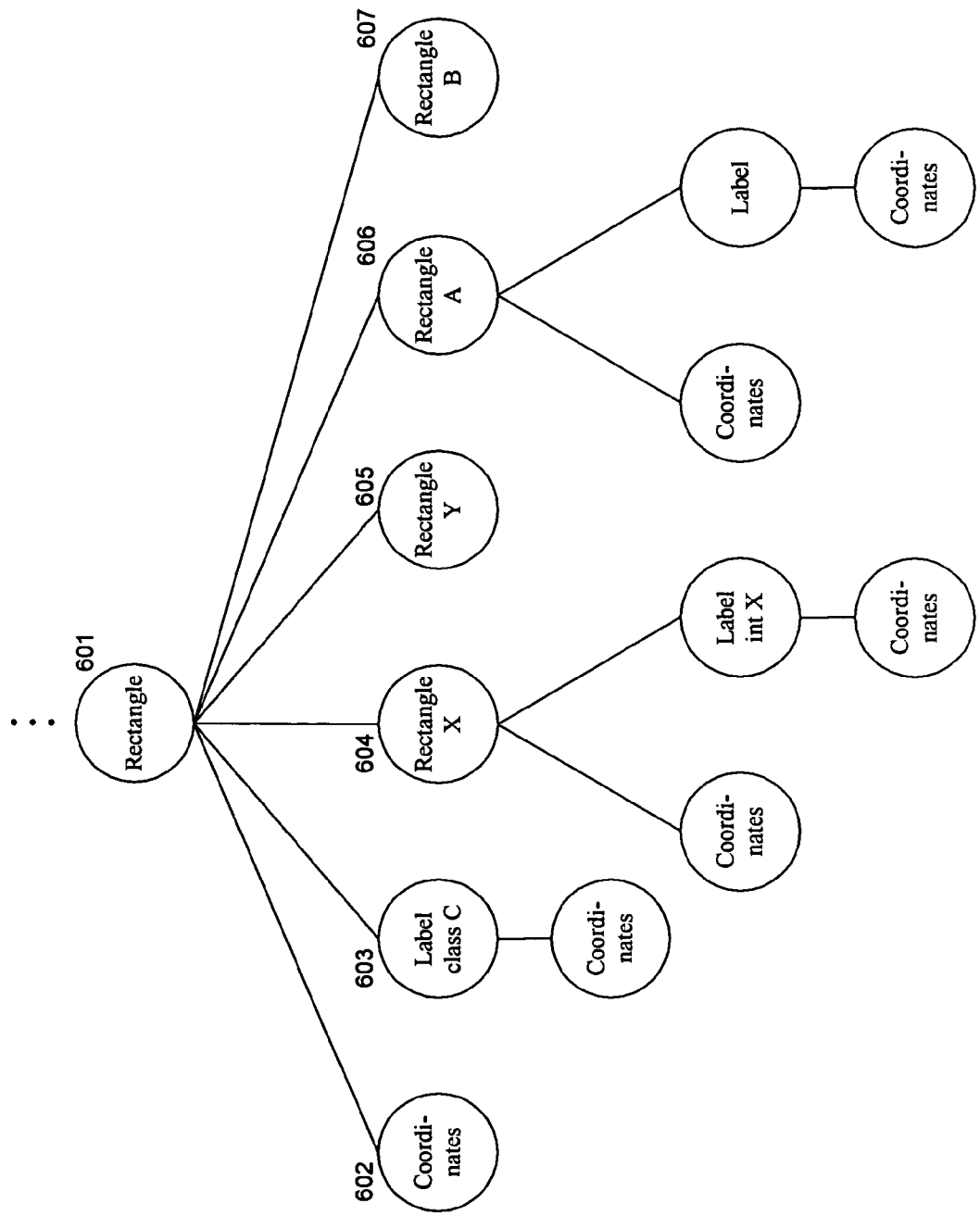
FIG. 6 is a diagram illustrating a version of the program tree that is output by the generate physical layout transform in one embodiment.
Figure 7:
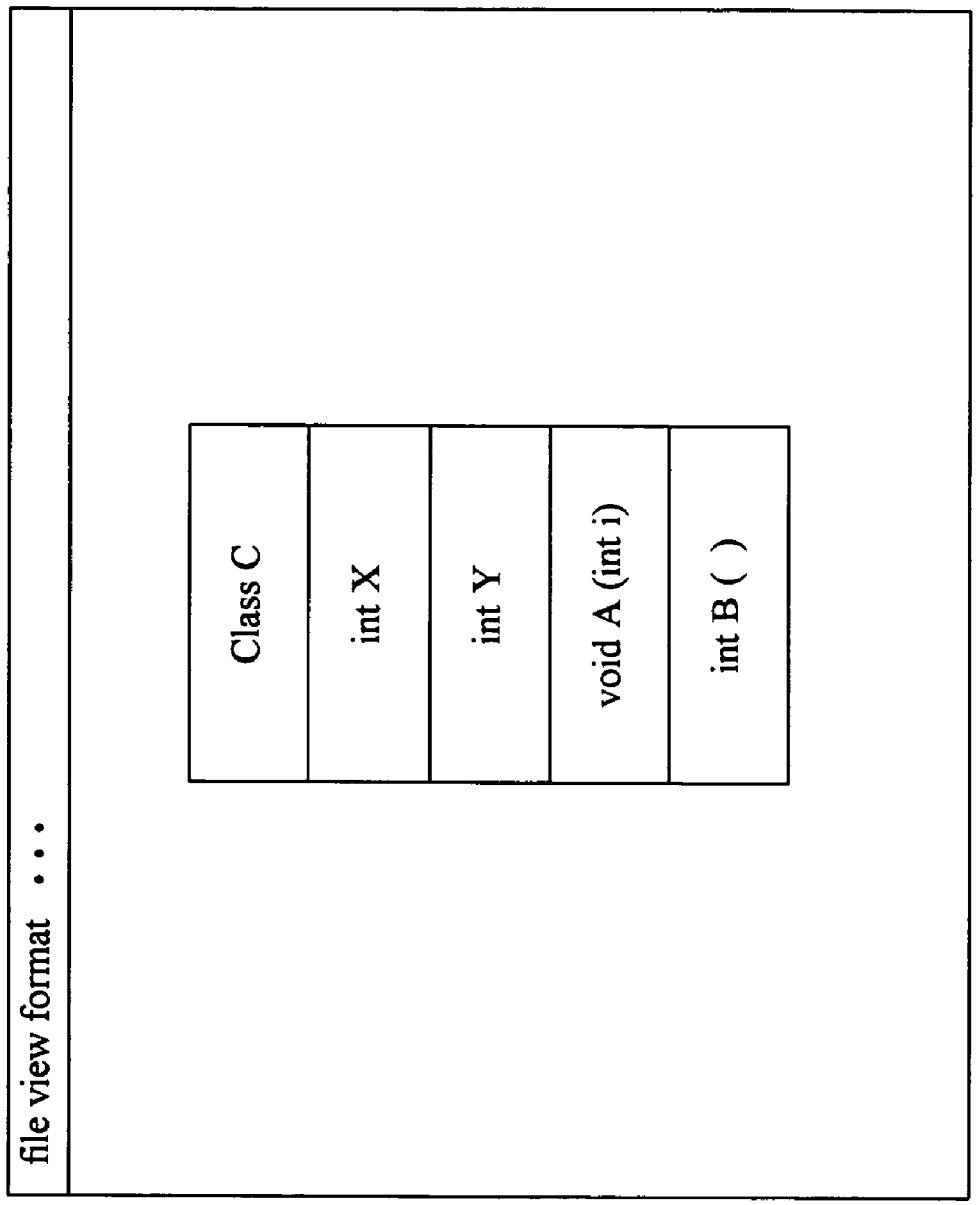
FIG. 7 illustrates a rendered representation of the physical layout.

FIGS. 3-6 are diagrams illustrating versions of a program tree in one embodiment. FIG. 3 is a diagram illustrating a version of the program tree that is output by the select transform in one embodiment. The program tree 300 represents a class definition that includes methods "A" and "B" and fields "X" and "Y." Program element 320 represents method "A"

and program elements 321-325 define the method. In this example, the program tree corresponds to class "C." FIG. 4 is a diagram illustrating a version of the program tree that is output by the filter transform in one embodiment. In this example, the filter transform filtered out the body of the methods and the comments associated with the methods in response to a parameter set by the command processor. FIG. 5 is a diagram illustrating a version of the program tree that is output by the generate logical layout transform in one embodiment. In this example, the transform rearranged the program elements of the program tree to place the fields before the methods and to order the fields and methods alphabetically in response to a parameter set by the command processor. FIG. 6 is a diagram illustrating a version of the program tree that is output by the generate physical layout transform in one embodiment. In this example, the transform specifies that a rectangle 601 is to represent the class "C" and sub-rectangles 604-607 or to represent the fields and methods of the class. Each rectangle has associated coordinates and a label. FIG. 7 illustrates a rendered representation of the physical layout.

Figure 8:
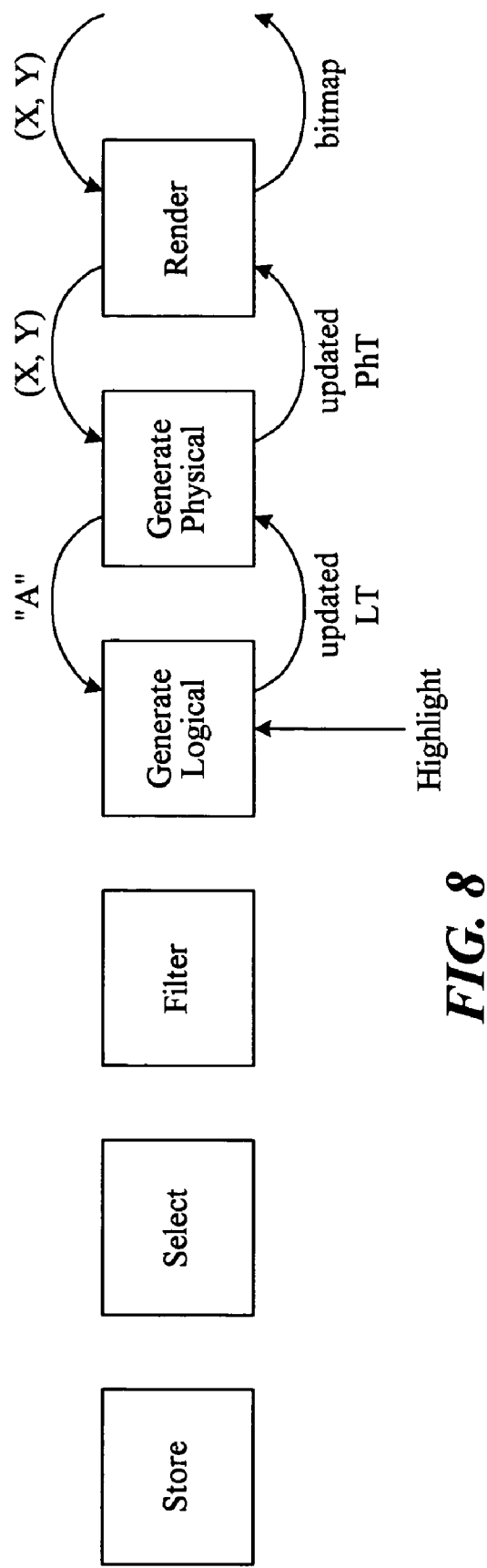
FIG. 8 is a block diagram illustrating the processing of the transform pipeline to select a portion of the program tree in one embodiment.

FIG. 8 is a block diagram illustrating the processing of the transform pipeline to highlight a portion of the program tree in one embodiment. In this example, the user has selected a displayed rectangle by selecting a point within the rectangle. The command processor provides the render transform with an identity-description that specifies the coordinates. The render transform transforms the identity-description to relate to the physical layout and provides it to the generate physical layout transform. The generate physical layout transform transforms the identity-description to relate to the logical layout and provides it to the generate logical layout transform. To transform the identity-description, the generate physical layout transform searches the physical layout program tree to identify the rectangle that contains the coordinates. In this example, the transform may have used the mapping to identify that the coordinates correspond to the rectangle that contains the label for method "A." The generate physical layout transform then provides the transformed identity-description to the generate logical layout transform. The generate logical layout transform inputs a highlight command from the command processor and updates the logical layout program tree to show that method "A" as indicated by the identity-description should be highlighted. The generate physical layout transform generates an updated physical layout program tree to effect the highlighting, and the render transform outputs a bitmap that highlights the rectangle corresponding to method "A."

Figure 9:
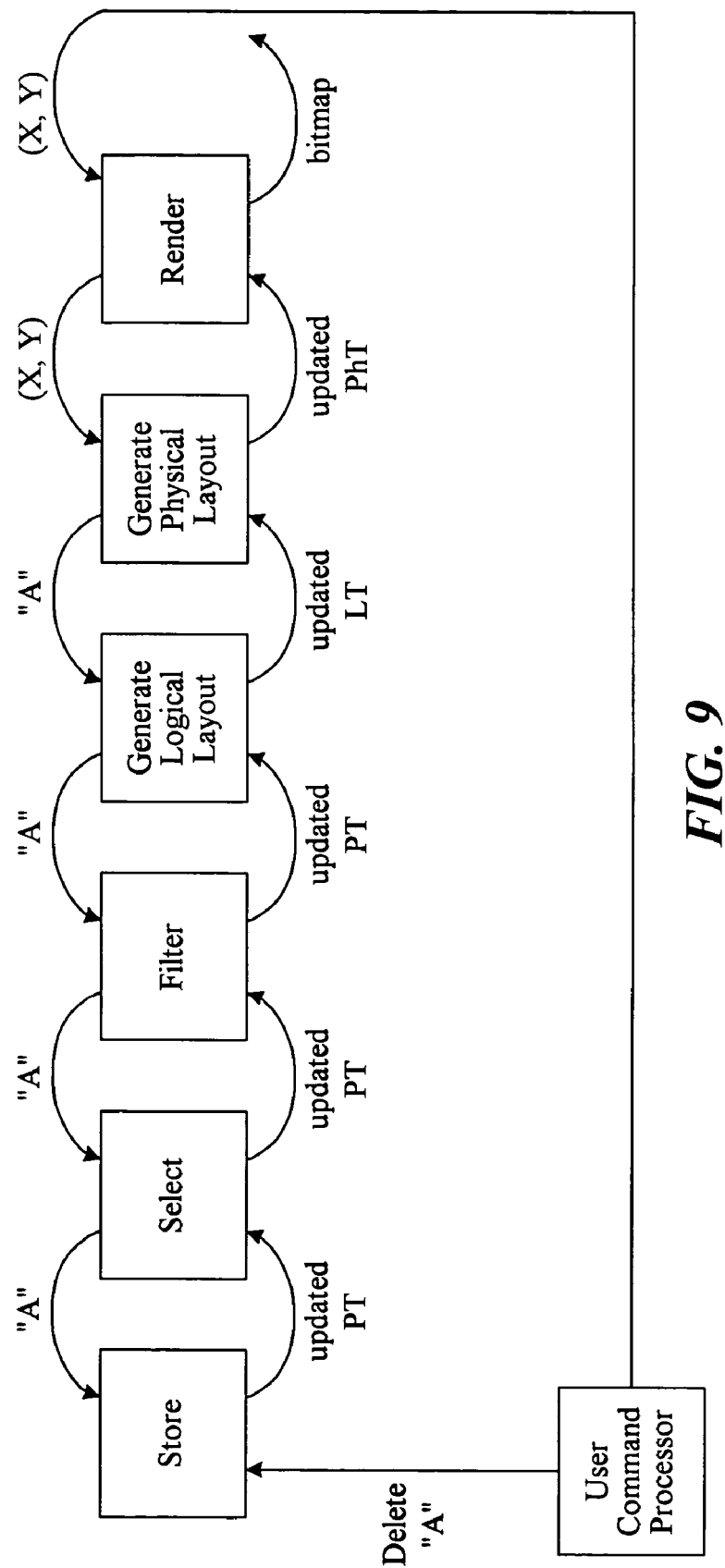
FIG. 9 is a block diagram illustrating processing of the transform pipeline to delete a portion of the program tree in one embodiment.
Figure 10:
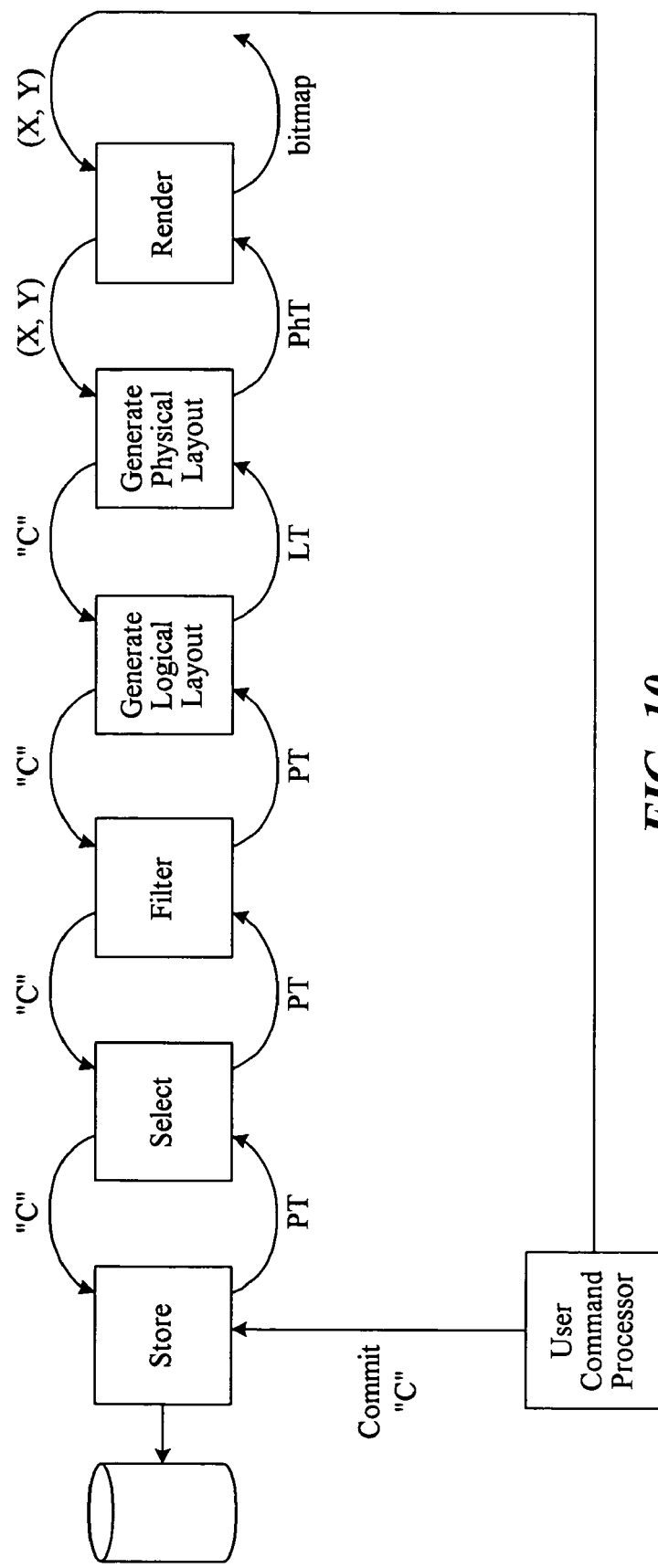
FIG. 10 is a block diagram illustrating the processing of the transform pipeline to commit changes to the program tree in one embodiment.

FIG. 9 is a block diagram illustrating processing of the transform pipeline to delete a portion of the program tree in one embodiment. In this example, when a user specifies to delete a portion of the program tree, the currently selected portion of the program tree is to be deleted. When the user specifies to delete, the user command processor invokes the delete function of the store transform passing the transformed identity-description. The identity-description may be retrieved by the command processor from the store transform for use as an operand (or argument) of the delete function. The store transform changes the program tree to delete method "A." The store transform may persistently store that change or may temporarily store that change until a commit instruction is received. The store transform then provides an updated program tree to the select transform which is propagated through the pipeline until the render transform outputs a representation of the class that reflects that the method has been deleted. The sequence of commands provided by the command processor to the store transform defines the program tree. FIG. 10 is a block diagram illustrating the processing of the transform pipeline to commit changes to the program tree in one embodiment.

In one embodiment, the transform may use a deferred or lazy evaluation technique to generate only portions of the output versions that are currently needed by subsequent transforms in the pipeline. For example, a physical layout transform may only perform the transformation for the portion of the design tree that will be visible on the display. The transform may identify the portion that is visible based on parameter settings indicating the window size and current position within the design tree. When the window is enlarged or the current position moved, the transform would perform the transformation for the newly visible portion, for example, after the user command processor set the appropriate parameters. Some transforms may add stubs or proxies as nodes of an output version, rather than perform the transformation on the subtree of the node. When a subsequent transform accesses a stub, the stub causes the transform to generate the portion of the output version of the design tree.

The transformation system may be implemented on a computer system that includes a central processing unit, memory, input devices (e.g., keyboard and pointing devices), output devices (e.g., display devices), and storage devices (e.g., disk drives). The memory and storage devices are computer-readable media that may contain instructions that implement the transformation system. In addition, the data structures and message structures may be stored or transmitted via a data transmission medium such as a signal on a communications link. Various communications links may be used, such as the Internet, a local area network, a wide area network, or a point-to-point dial-up connection.

Figure 11:
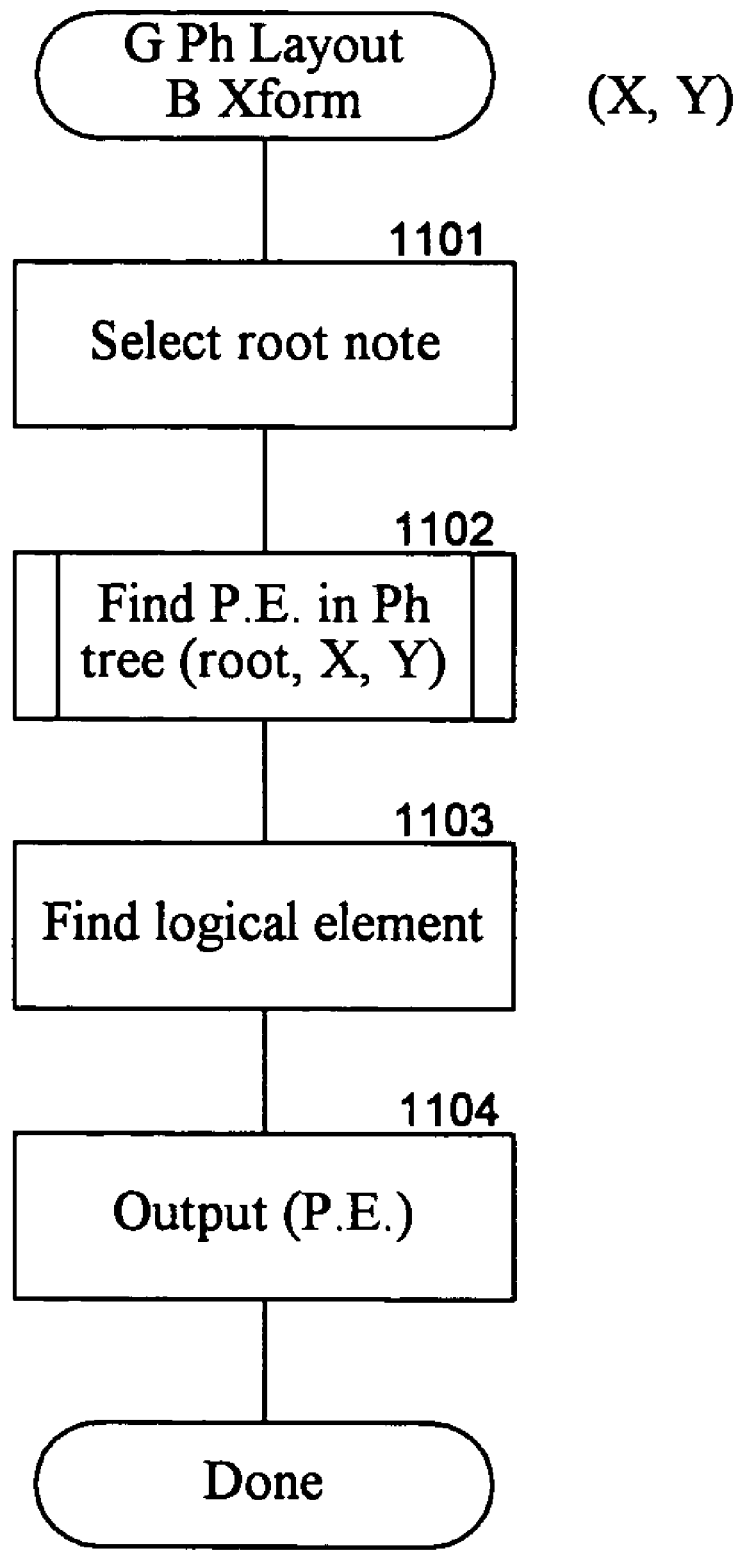
FIG. 11 is a flow diagram representing the processing of the backwards transform of the generate physical layout transform in one embodiment.

FIG. 11 is a flow diagram representing the processing of the backwards transform of the generate physical layout transform in one embodiment. This transform is passed coordinates as the identity-descriptions. The transform identifies the element in the physical layout program tree that contains the coordinates and maps that element to the corresponding element in the logical layout program tree. In block 1101, the transform selects the root node of the physical layout program tree. In block 1102, the transform invokes a component to find the element in the physical program tree corresponding to the coordinates. In block 1103, the transform finds the element in the logical program tree corresponding to the element in the physical program tree. When the transform initially generates the physical layout program tree, it may have generated a mapping between the elements of physical layout program tree and the elements of the logical layout program tree. In block 1104, the transform outputs the operator along with identification of the element of the logical layout program as the identity-description and then completes.

Figure 12:
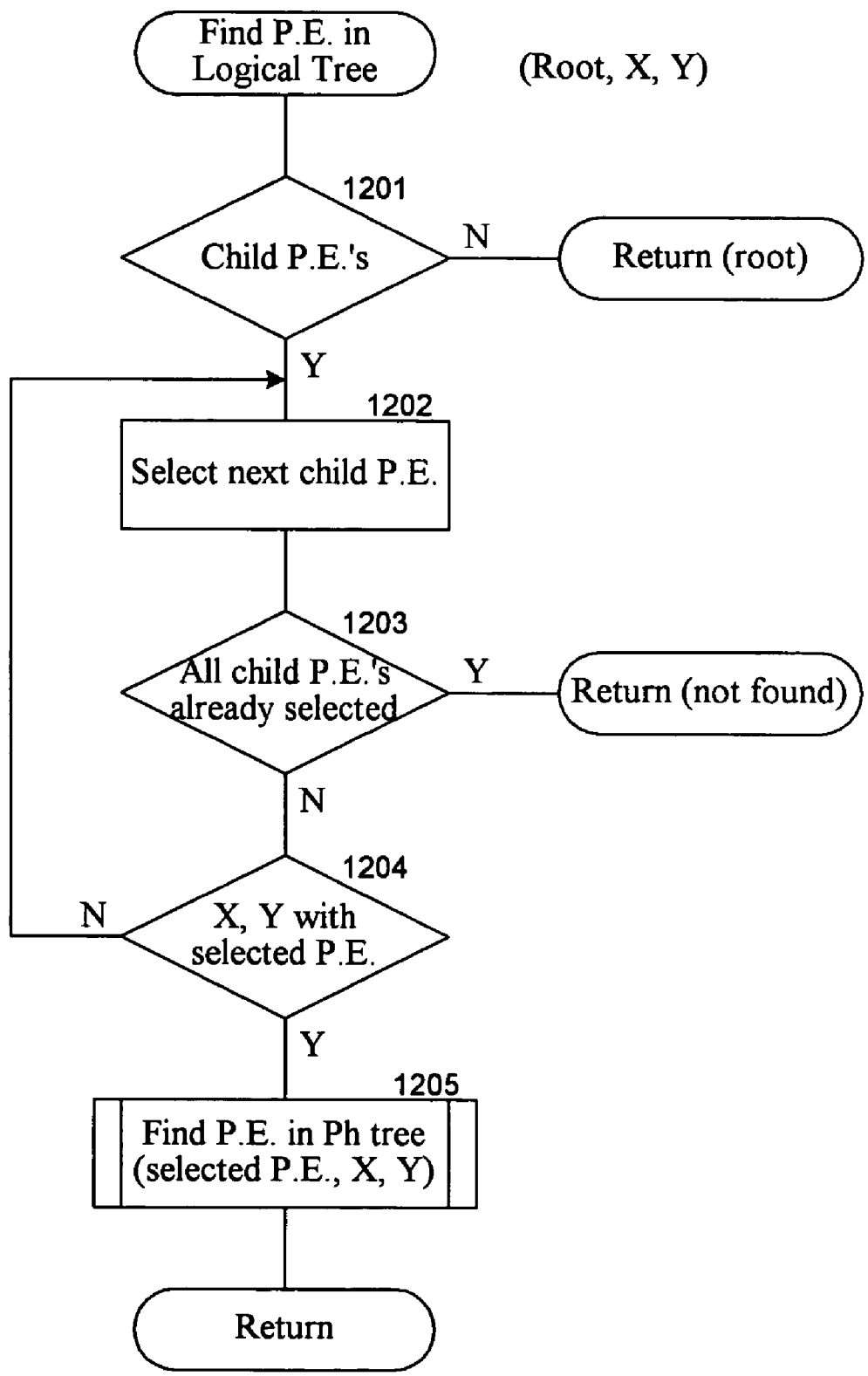
FIG. 12 is a flow diagram representing the find program element in physical layout component in one embodiment.

FIG. 12 is a flow diagram representing the find element in physical layout component in one embodiment. The component is passed the root node of a subtree of the physical layout program tree that contains the coordinates. The component is recursively invoked to locate the innermost element that contains the coordinates. In decision block 1201, if the root node has a child element, then the component continues at block 1202, else the component returns the root because it is the innermost element. In blocks 1202-1204, the component loops identifying the child element that contains the coordinates. In block 1202, the component selects the next child element. In decision block 1203, if all the child elements have already been selected, then the component returns an error, else the component continues at block 1204. In decision block 1204, if the coordinates are within the selected element, then the component continues at block 1205, else the component loops to block 1202 to select the next child element. In block 1205, the component recursively invokes itself passing the selected element. The component then returns the element returned by the recursive invocation in block 1205.

One skilled in the art will appreciate that although specific embodiments of the transformation system have been described herein for purposes of illustration, various modifications may be made without deviating from the spirit and scope of the invention. In one embodiment, the transforms and state of a pipeline can be shared by different views. For example, a C++ view and a UML can share the store and select transforms of FIG. 1. The select transform would be connected to the filter transforms of the C++ view and the UML view. A programmer can be simultaneously viewing and editing using both views. Programmer input via a UML can propagate backward in the UML pipeline as instructions to the shared select transform. The select transform can then output a transformed version of the program tree that can propagate forward via both the UML and C++ pipeline. Thus, pipelines can be represented as a tree structure with branches occurring at various transforms. One skilled in the art will also understand that the transforms described are merely representative. A wide variety functions can be performed by transform, and transforms can be developed at different levels of granularities. For example, if the computer program is stored in encrypted format, then an encrypt/decrypt transform may be used. As another example, if the computer program is stored in an unstructured format, then a transform to convert to structured format may be used. Also, functions of different transforms can be combined when each view would use the functions in the same sequence. The functions can be extended and combined with other transform functionality due to the modular architecture of the pipeline. Accordingly, the invention is defined by the appended claims.

I claim:

1. A method in a computer system having a memory and a processor for transforming a design tree representing a document, the method comprising:
   inputting by a source transform an identity-description identifying a subset of a version of the design tree and outputting by the source transform the subset of the version of the design tree identified by the input identity-description;
   for each of a plurality of intermediate transforms,
      inputting by the intermediate transform a version of the design tree and outputting by the intermediate transform a transformed version of the design tree; and
      inputting by the intermediate transform an identity-description identifying a subset of the transformed version of the design tree and outputting by the intermediate transform a transformed identity-description identifying a subset of the input version of the design tree
      wherein each intermediate transform is reversible such that forward transforms transform versions of the design tree and backward transforms transform identity-descriptions identifying subsets of versions of the design tree; and
   inputting by a sink transform a version of the design tree and outputting by the sink transform an identity-description identifying a subset of the input version of the design tree,
   wherein the transforms form a pipeline having a modular architecture starting with the source transform, continuing with the intermediate transforms, and ending with the sink transform in the forward direction and starting with the sink transform, continuing with the intermediate transforms, and ending with the source transform in the backward direction.

2. The method of claim 1, further comprising:
   receiving an editing command input from a user, the editing command specifying a portion of the design tree and an editing operation to be performed on the specified portion;
   determining an appropriate intermediate transform for effecting the performance of the editing command; and
   invoking a function of the determined appropriate intermediate transform.

3. A computer system with a processor and memory for transforming a structured representation of a document, the structured representation being a design tree, comprising:
   a source transform for inputting an identity-description identifying a subset of a version of the structured representation and outputting the subset of the version of the structured representation identified by the input identity-description;
   a plurality of intermediate transforms, each intermediate transform for inputting a version of the structured representation and outputting a transformed version of the structured representation and for inputting an identity-description identifying a subset of the transformed version of the structured representation and outputting a transformed identity-description identifying a subset of the input version of the structured representation, wherein each intermediate transform is reversible such that forward transforms transform versions of the structured representation and backward transforms transform identity-descriptions identifying subsets of versions of the structured representation, each intermediate transform having a command interface for setting state parameters to control the transformations of the transform;
   a sink transform for inputting a version of the structured representation and rendering the version of the structured representation on an output device and for inputting an identity-description of a portion of the structured representation generated by a user command processor and outputting an identity-description identifying a subset the structured representation;
   a user command processor for,
      receiving an editing command input from a user, the editing command specifying a portion of the design tree and an editing operation to be performed on the specified portion,
      generating an identity-description corresponding to the specified portion of the design tree,
      sending the generated identity-description to the sink transform in the backward direction,
      determining an appropriate intermediate transform for effecting the performing of the editing command,
      invoking a function of the command interface of the determined appropriate intermediate transform to effect the performing of the editing command on the specified portion of the design tree
      so that when the determined appropriate intermediate transform receives an indication of the generated identity-description, the determined appropriate intermediate transform can effect the performing of the editing command and then send an indication of the structured representation to the sink transform in the forward direction
   wherein the transforms form a pipeline having a modular architecture starting with the source transform, continu- 4. The computer system of claim 3 wherein a transform provides a command interface for modifying the document.

5. The computer system of claim 4 wherein user-editing commands provided to the source transform via the command interface define the document.

6. The computer system of claim 3 wherein the source transform coordinates access to the structured representation stored in persistent storage.

7. The computer system of claim 3 wherein the sink transform provides a display of the input version of the structured representation and receives an identity-description based on user input identifying a subset of a displayed version of the structured representation.

8. The computer system of claim 3 wherein the output version of the structured representation of a transform in the pipeline is the input version of the structured representation of the next transform in the pipeline.

9. The computer system of claim 3 wherein the output identity-description of a transform in the pipeline is the input identity-description for the previous transform in the pipeline.

10. The computer system of claim 3 wherein an input identity-description of a transform identifies a subset of the output version of the structured representation and the output identity-description of the transform identifies a subset of the input version of the structured representation.

11. The computer system of claim 3 wherein a transform only transforms portions of the input version of the structured document needed by the subsequent transforms in the pipeline.

12. The computer system of claim 11 wherein the portions that are transformed are identified based on a user command.

13. The computer system of claim 11 wherein the output version of the structured document includes a stub representing a non-transformed portion of the input version of the structured document.

14. The computer system of claim 13 wherein when the stub is accessed, the non-transformed portion is transformed.

15. The computer system of claim 3 wherein a transform defers the transformation of a portion of the input version of the design tree of the structured document until the portion is needed by a subsequent transform.

16. The computer system of claim 3 wherein the user command processor sets parameters of a transform to effect the performing of the editing command.

17. The computer system of claim 16 wherein a sequence of setting of parameters of the source transform defines a source version of the structured document.

18. The computer system of claim 17 wherein a version of the source version of the structured document is generated from the sequence.

19. The computer system of claim 3 wherein a transform applies its transformation multiple times to its input version to generate an output version.

20. The computer system of claim 3 wherein invoking a function of the determined appropriate intermediate transform includes passing an identity-description as a parameter to the function.

21. The computer system of claim 3 wherein the determined appropriate intermediate transform propagates an updated version of the design tree to another intermediate transform.

22. The computer system of claim 3 wherein the editing command is a highlight command.

23. The computer system of claim 3 wherein the editing command is a delete command.

24. A computer system having a memory and a processor for transforming a design tree representing a document, the computer system comprising:

a store transform for inputting an indication of an identity-description identifying a current version of the design tree and outputting the current version of the design tree identified by the input identity-description;

a first reversible intermediate transform for, in the forward direction, inputting from the store transform the current version of the design tree and outputting to a second reversible intermediate transform a first transformed version of the design tree, and in the backward direction, inputting from the second reversible intermediate transform an indication of an identity-description identifying the first transformed version of the design tree and outputting to the store transform an indication of an identity-description identifying the current version of the design tree, wherein the first reversible intermediate transform has a first command interface for setting state parameters to control the transformations of the first reversible intermediate transform;

the second reversible intermediate transform for, in the forward direction, inputting from the first reversible intermediate transform the first transformed version of the design tree and outputting to a sink transform a second transformed version of the design tree, and in the backward direction, inputting from the sink transform an indication of an identity-description identifying the second transformed version of the design tree and outputting to the first reversible intermediate transform an indication of an identity-description identifying the first transformed version of the design tree, wherein the second reversible intermediate transform has a second command interface for setting state parameters to control the transformations of the second reversible intermediate transform;

the sink transform for inputting from the second reversible intermediate transform the second transformed version of the design tree and rendering the second transformed version of the design tree on an output device and for inputting an indication of an identity-description identifying a portion of the rendered version of the design tree and outputting an indication of an identity-description identifying the second transformed version of the design tree; and a user command processor for, receiving an editing command input from a user, the editing command specifying an editing operation to be performed on the rendered version of the design tree, generating an indication of an identity-description identifying a portion of the rendered version of the design tree, determining an appropriate reversible intermediate transform for effecting the performance of the editing command, invoking a function of the determined appropriate reversible intermediate transform, sending the generated indication of the identity-description identifying a portion of the rendered version of the design tree to the sink transform for propagation to the determined appropriate reversible intermediate transform in the backward direction so that the determined appropriate reversible intermediate transform can perform the editing command.

* * * * *

UNITED STATES PATENT AND TRADEMARK OFFICE
CERTIFICATE OF CORRECTION

PATENT NO.         : 7,607,099 B2                                      Page 1 of 1
APPLICATION NO.    : 10/701369
DATED              : October 20, 2009
INVENTOR(S)        : Charles Simonyi It is certified that error appears in the above-identified patent and that said Letters Patent is hereby corrected as shown below:

Title Page item 56 On page 2, in column 2, under "Other Publications", line 11-12, delete "OOPSALA' 88" and insert -- OOPSLA' 88 --, therefor.

Signed and Sealed this

Fifth Day of January, 2010

David J. Kappos
*Director of the United States Patent and Trademark Office*

UNITED STATES PATENT AND TRADEMARK OFFICE
CERTIFICATE OF CORRECTION

PATENT NO. : 7,607,099 B2 Page 1 of 1
APPLICATION NO. : 10/701369
DATED : October 20, 2009
INVENTOR(S) : Charles Simonyi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 421 days.

Signed and Sealed this

Twelfth Day of October, 2010

David J. Kappos
*Director of the United States Patent and Trademark Office*